United States Patent [19]
Tanbo et al.

[11] Patent Number: 5,167,821
[45] Date of Patent: Dec. 1, 1992

[54] METHOD FOR THICKENING AND DEWATERING SLURRY SLUDGE

[75] Inventors: Norihito Tanbo, Sapporo; Hiromu Fukano; Yasuhiko Kihara, both of Tokyo, all of Japan

[73] Assignees: Norihito Tambo, Sapporo; NKK Corporation, Tokyo, both of Japan

[21] Appl. No.: 646,732
[22] PCT Filed: Jul. 3, 1990
[86] PCT No.: PCT/JP90/00859
§ 371 Date: Jan. 29, 1991
§ 102(e) Date: Jan. 29, 1991
[87] PCT Pub. No.: WO91/00249
PCT Pub. Date: Oct. 1, 1991

[30] Foreign Application Priority Data
Jul. 3, 1989 [JP] Japan ................... 1-171442

[51] Int. Cl.$^5$ .................. C02F 11/02; C02F 11/14; B01D 33/048
[52] U.S. Cl. .................. 210/609; 210/710; 210/713; 210/726; 210/738; 210/768; 210/783; 210/804; 210/400
[58] Field of Search .............. 210/712, 713, 738, 400, 210/768, 800, 803, 804, 805, 195.1, 197, 196, 205, 252, 259, 702, 726, 783, 609, 710

[56] References Cited

U.S. PATENT DOCUMENTS

| | | | |
|---|---|---|---|
| 1,789,425 | 1/1931 | Cabrera | 210/400 |
| 2,190,596 | 2/1940 | Dorr | 210/738 |
| 3,049,236 | 8/1962 | Cohen De Lara et al. | 210/400 |
| 3,347,378 | 10/1967 | Arnold et al. | 210/400 |
| 3,393,055 | 7/1968 | Stevenson | 210/738 |
| 3,613,564 | 10/1971 | Adamski | |
| 4,707,272 | 11/1987 | Kistler | 210/709 |

FOREIGN PATENT DOCUMENTS

| | | |
|---|---|---|
| 0196507 | 10/1986 | European Pat. Off. |
| 1954909 | 3/1970 | Fed. Rep. of Germany |
| 57-10731 | 3/1982 | Japan |
| 61-197100 | 9/1986 | Japan |
| 2066686 | 7/1981 | United Kingdom |
| 1172216A | 9/1986 | United Kingdom |

*Primary Examiner*—Stanley S. Silverman
*Assistant Examiner*—Neil M. McCarthy
*Attorney, Agent, or Firm*—Frishauf, Holtz, Goodman & Woodward

[57] ABSTRACT

A method for efficiently thickening and dewatering a slurry sludge in a short period of time without the necessity of a vast site, which comprises the steps of: stirring a slurry sludge added with a coagulant in a stirring tank to convert the slurry sludge into a floc; supplying the floc and a superantant liquid, which are produced in the stirring tank, onto an inlet side of an inclined endless travelling filter cloth of an endless travelling filter cloth type dewatering unit, which comprises a dewatering tank and the above-mentioned inclined endless travelling filter cloth arranged in the dewatering tank; continuously travelling the thus supplied floc, on the endless travelling filter cloth, toward an exit side thereof; thickening the floc on a portion of the endless travelling filter cloth, which portion is located in the supernatant liquid in the dewatering tank, and dewatering the thus thickened floc on a portion of the endless travelling filter cloth, which portion is located above the surface of the supernatant liquid in the dewatering tank.

10 Claims, 5 Drawing Sheets

METHOD FOR THICKENING AND DEWATERING SLURRY SLUDGE

FIELD OF THE INVENTION

The present invention relates to a method for thickening and dewatering a slurry sludge separated from a sewage such as a waste water.

BACKGROUND OF THE INVENTION

A sewage such as a waste water is conventionally treated as follows: As shown in a flow diagram of a conventional sewage treatment system of FIG. 6, a sewage is introduced into a primary sedimentation tank 15, in which a sludge comprising grit and screenings in the sewage is sedimented to primarily separate the sludge from the sewage. The sewage from which the sludge has thus been primarily separated is introduced into an aeration tank 16 together with a small amount of sludge returned from a final sedimentation tank 17 described later, in which the sewage is aerated. Then, the thus aerated sewage is introduced into a final sedimentation tank 17, in which a sludge remaining in the sewage is sedimented to separate the remaining sludge from the sewage. A supernatant liquid resulting from the separation of the remaining sludge is released. As described above, part of the sludge sedimented in the final sedimentation tank 17 is returned to the aeration tank 16 for reuse for the aeration of the sewage.

Figure 6:
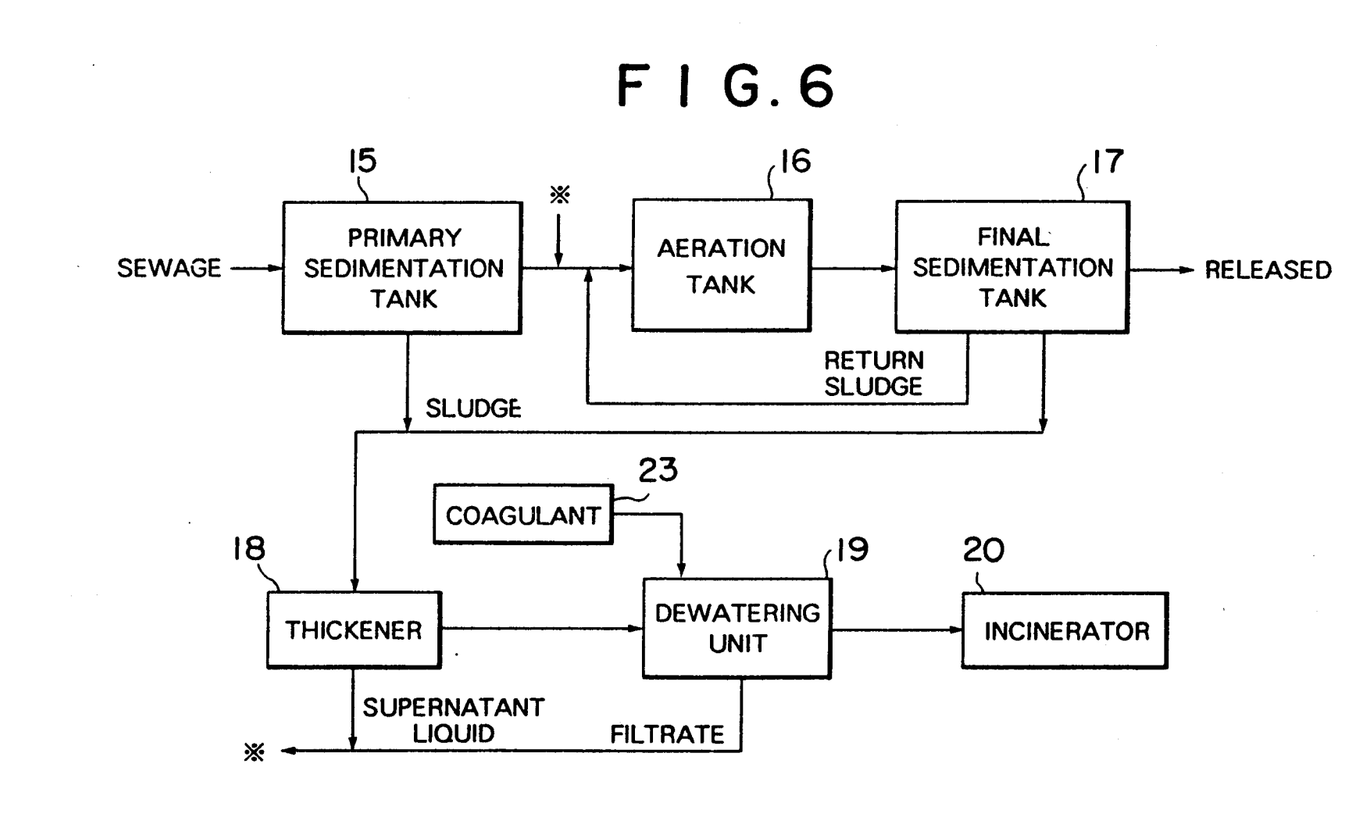
FIG. 6 is a flow diagram illustrating a typical conventional sewage treatment system.

A slurry sludge sedimented in the primary sedimentation tank 15 is taken out therefrom, and a slurry sludge sedimented in the final sedimentation tank 17 is taken out therefrom. The slurry sludge taken out from each of the primary sedimentation tank 15 and the final sedimentation tank 17 is introduced into a thickening equipment 18, in which the slurry sludge is thickened. Then, the slurry sludge thus thickened in the thickening equipment 18 is introduced into a dewatering equipment 19, in which a coagulant 23 is added to the slurry sludge, and the slurry sludge is dewatered in the dewatering equipment 19. The sludge dewatered in the dewatering equipment 19 is incinerated in an incinerator 20. A supernatant liquid produced in the thickening equipment 18 and a filtrate produced in the dewatering equipment 19 are returned to an inlet side of the aeration tank 16. The sewage is thus treated.

As described above, a slurry sludge is conventionally thickened in the thickening equipment 18, and then dewatered in the dewatering equipment 19 provided separatedly from the thickening equipment 18.

As the thickening equipment 18 for thickening a slurry sludge, the following types are conventionally employed:
 (a) a gravity type thickener,
 (b) a floatation type thickener, and
 (c) a centrifugal type thickener.

As the dewatering equipment 19 for dewatering the thickened slurry sludge, the following types are conventionally employed:
 (a) a centrifugal type dewatering unit,
 (b) a belt-press type dewatering unit,
 (c) a pressurizing type dewatering unit, and
 (d) a vacuum type dewatering unit.

The above-mentioned conventional thickening and dewatering of a slurry sludge have the following problems:

(1) When a gravity type thickener is used as the thickening equipment 18, a slurry sludge is sedimented by its own gravity and thickened. A long period of time is therefore required for thickening, and a vast site is required for thickening of a large amount of slurry sludge.

It is furthermore necessary to hold a slurry sludge at a standstill for long period of time for thickening the slurry sludge, during which the slurry sludge may become anaerobic and detrimental elements such as phosphorus contained in the slurry sludge may thus be easily dissolved into the supernatant liquid. Moreover, the long holding of the slurry sludge at a standstill makes it easier for the slurry sludge to be deteriorated, so that it is necessary to add a coagulant in a larger amount when dewatering the slurry sludge in the dewatering equipment 19, and a cakey sludge after dewatering tends to have a higher water content.

(2) When a floatation type thickener is used as the thickening equipment 18, a slurry sludge adheres to innumerable fine bubbles blown therein, floats up under the effect of buoyancy of the bubbles, and is thus thickened. A long period of time is therefore required for thickening, and a vast site is required for thickening of a large amount of slurry sludge, thus posing problems similar to those in the above-mentioned gravity type thickener.

(3) When a centrifugal type thickener is used as the thickening equipment 18, an electric power cost and a maintenance and management cost in huge amounts are necessary, with production of noise and vibration during operation, against which some measures should be taken.

(4) The centrifugal type, the belt-press type, the pressurizing type and the vacuum type dewatering units as the dewatering equipment 19 require an equipment cost and an operating cost in considerable amounts.

(5) Transfer of the slurry sludge thickened by means of the thickening equipment 18 to the dewatering equipment 19 requires many conduits and pumps, thus resulting in a high equipment cost.

Under such circumstances, there is a strong demand for the development of a method for economically and efficiently thickening and dewatering a slurry sludge, not requiring a vast site, in a short period of time with a low equipment cost, but such a method has not as yet been proposed.

SUMMARY OF THE INVENTION

An object of the present invention is therefore to provide a method for economically and efficiently thickening and dewatering a slurry sludge, not requiring a vast site, in a short period of time with a low equipment cost.

In accordance with one of the features of the present invention, there is provided a method for thickening and dewatering a slurry sludge, characterized by comprising the steps of:

continuously supplying a slurry sludge and a coagulant into a stirring tank provided substantially vertically, in which said slurry sludge and said coagulant are stirred to convert said slurry sludge into a floc;

providing, adjacently to said stirring tank, an endless travelling filter cloth type dewatering unit which comprises a dewatering tank and an inclined endless travelling filter cloth arranged in said dewatering tank with an inlet side thereof located at a lower portion of one end of said dewatering tank and an exit side thereof located outside above the other end of said dewatering tank;

continuously supplying said floc and a supernatant liquid, which are produced in said stirring tank, onto said inlet side of said endless travelling filter cloth of said endless travelling filter cloth type dewatering unit; and continuously travelling said floc thus continuously supplied, on said endless travelling filter cloth, toward said exit side of said endless travelling filter cloth;

thereby thickening said floc on a portion of said endless travelling filter cloth, which portion is located in said supernatant liquid in said dewatering tank, and dewatering said thickened floc on a portion of said endless travelling filter cloth, which portion is located above the surface of said supernatant liquid in said dewatering tank.

DETAILED DESCRIPTION OF PREFERRED EMBODIMENTS

From the above-mentioned point of view, extensive studies were carried out to develop a method for economically and efficiently thickening and dewatering a slurry sludge, not requiring a vast site, in a short period of time with a low equipment cost. As a result, the following findings were obtained: It is possible to economically and efficiently thicken and dewater a slurry sludge, with a low equipment cost, in a short period of time, and not requiring a vast site, by stirring a slurry sludge added with a coagulant in a stirring tank to convert the slurry sludge into a floc; continuously supplying the floc and a supernatant liquid, which are produced in the stirring tank, onto an inlet side of an endless travelling filter cloth of an endless travelling filter cloth type dewatering unit, provided adjacently to the stirring tank, which dewatering unit comprises a dewatering tank and the above-mentioned endless travelling filter cloth; continuously travelling the floc thus continuously supplied, on the endless travelling filter cloth, toward an exit side of the endless travelling filter cloth; thereby thickening the floc on a portion of the endless travelling filter cloth, which portion is located in the supernatant liquid in the dewatering tank, and dewatering the thus thickened floc on a portion of the endless travelling filter cloth, which portion is located above the surface of the supernatant liquid in the dewatering tank.

The present invention was made on the basis of the above-mentioned findings. The method of the present invention for thickening and dewatering a slurry sludge is described below with reference to the drawings.

Figure 1:
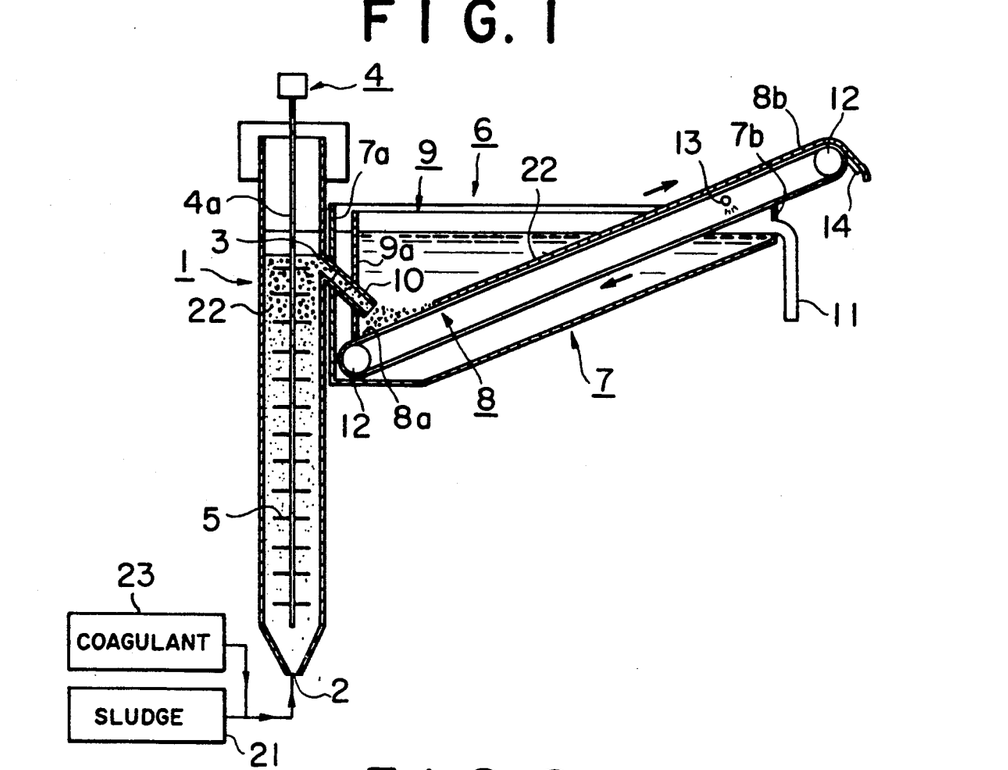
FIG. 1 is a schematic vertical sectional view illustrating an embodiment of the apparatus used in the method of the present invention.

FIG. 1 is a schematic vertical sectional view illustrating an embodiment of the apparatus used in the method of the present invention. As shown in FIG. 1, a stirring tank 1 is provided substantially vertically. A vertical shaft 4a is provided in the stirring tank 1 along the axis thereof. The vertical shaft 4a has a length substantially identical to that of the stirring tank 1, and is rotated around the axis thereof by means of a motor 4 fitted to the upper end of the vertical shaft 4a. A plurality of stirring blades 5 are fixed to the vertical shaft 4a at prescribed intervals in the longitudinal direction thereof. The stirring tank 1 has a feed port 2 of slurry sludge at a lower end thereof and a discharge port 3 of slurry sludge in the upper portion thereof.

An endless travelling filter cloth type dewatering unit 6 is provided adjacently to the stirring tank 1. The endless travelling filter cloth type dewatering unit 6 comprises a dewatering tank 7 adjacent to the stirring tank 1 and an inclined endless travelling filter cloth 8 arranged in the dewatering tank 7. An inlet side 8a of the endless travelling filter cloth 8 is located at a lower portion of a side wall 7a on the side of one end of the dewatering tank 7, and an exit side 8b of the endless travelling filter cloth 8 is located outside above another side wall 7b on the side of the other end of the dewatering tank 7. In FIG. 1, 12 is a pair of pulleys for travelling the endless travelling filter cloth 8 in the direction as shown by the arrow in FIG. 1.

Figure 2:
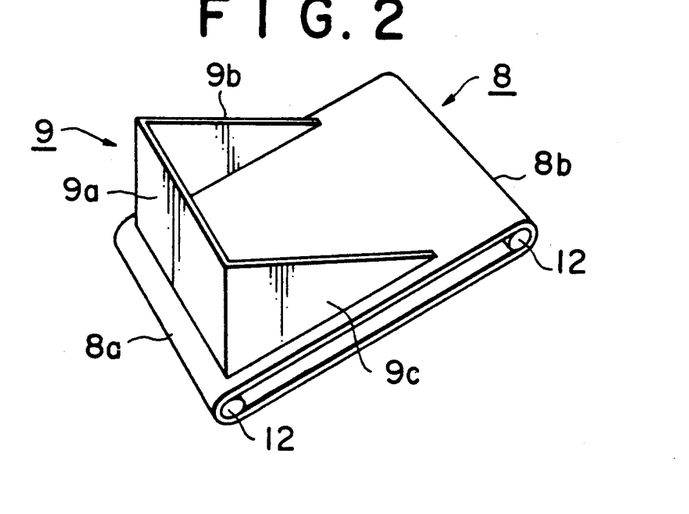
FIG. 2 is a schematic perspective view illustrating an endless travelling filter cloth and an inner frame of an endless travelling filter cloth type dewatering unit used in the apparatus shown in FIG. 1.

As shown in the schematic perspective view of FIG. 2, an inner frame 9 is arranged on the endless travelling filter cloth 8 in the dewatering tank 7. The inner frame 9 comprises a side wall 9a in the width direction of the endless travelling filter cloth 8, which is adjacent to the side wall 7a on the side of the one end of the dewatering tank 7, and side walls 9b and 9c in the longitudinal direction of the endless travelling filter cloth 8. The side of the inner frame 9 in the travelling direction of the endless travelling filter cloth 8 is open. The lower end of each of the side walls 9a, 9b and 9c of the inner frame 9 is in contact with the endless travelling filter cloth 8, and the upper end of each of the side walls 9a, 9b and 9c is adjacent to the upper end of the dewatering tank 7.

A discharge pipe 10 is connected to the discharge port 3 provided in the upper portion of the stirring tank 1. The discharge pipe 10 runs through the side wall 7a of the dewatering tank 7 and the side wall 9a of the inner frame 9, and its open end is located above the inlet side 8a of the endless travelling filter cloth 8.

A filtrate discharge pipe 11 for discharging filtrate from the dewatering tank 7 is fitted to the another side wall 7b on the side of the other end of the dewatering tank 7. In FIG. 1, 13 is a spray for cleaning the endless travelling filter cloth 8, which is provided on the reverse side thereof, and 14 is a scraper for scraping off a dewatered cakey floc 22 on the endless travelling filter cloth 8, which is provided adjacently to the exit side 8b of the endless travelling filter cloth 8.

Figure 3:
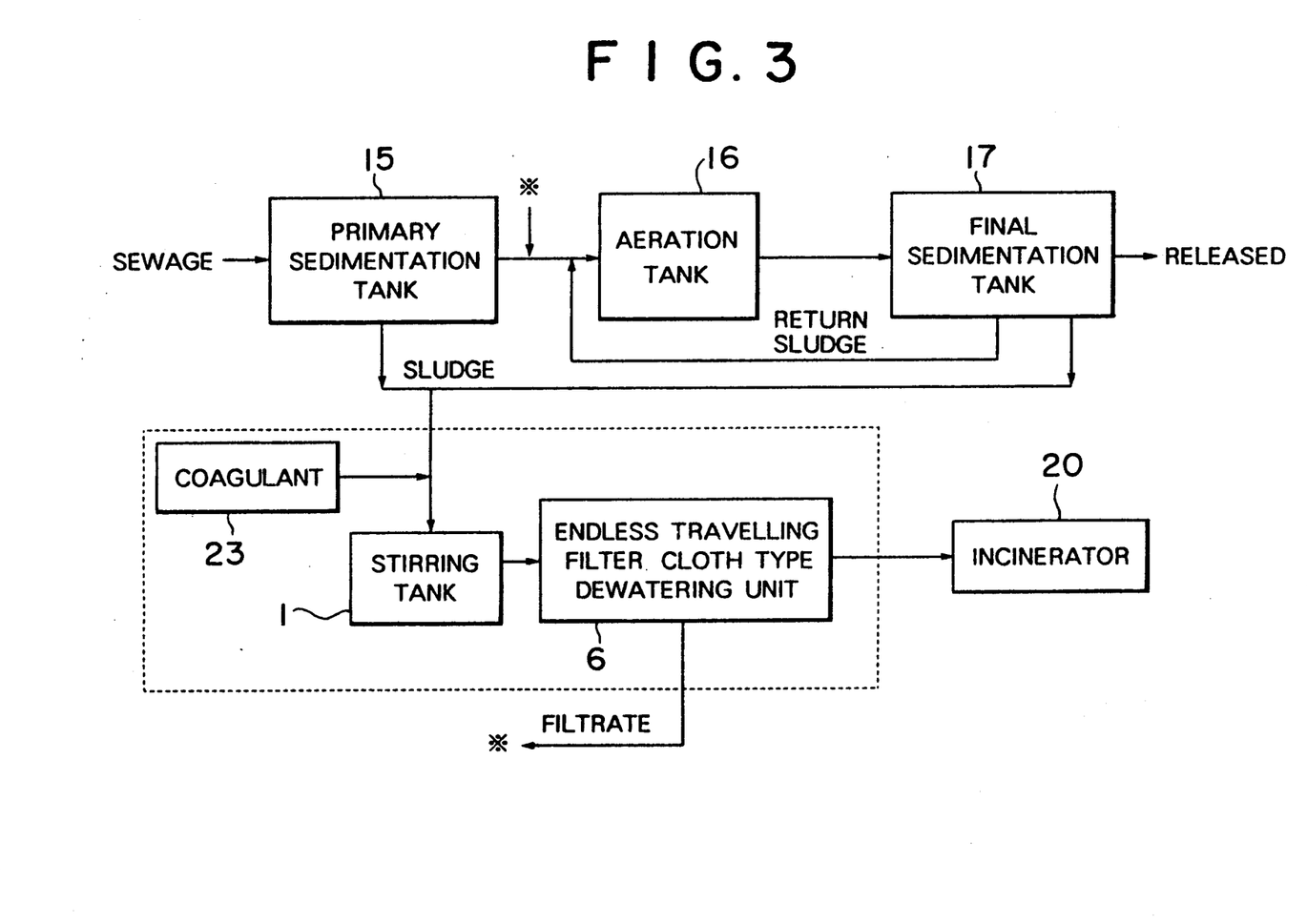
FIG. 3 is a flow diagram illustrating a sewage treatment system according to the method of the present invention.

As shown in FIGS. 1 and 3, a coagulant 23 is added to a slurry sludge 21 taken out from each of a primary sedimentation tank 15 and a final sedimentation tank 17, and the slurry sludge 21 thus added with the coagulant 23 is continuously supplied into the stirring tank 1 through the feed port 2 at the lower end thereof by means of a pump not shown. The motor 4 is driven to cause the stirring blades 5, together with the vertical shaft 4a, to rotate at revolutions of, for example, from 10 to 60 rpm.

The slurry sludge 21 and the coagulant 23 in the stirring tank 1 rise up in the stirring tank 1 while being stirred by means of the stirring blades 5, and in the meantime, the slurry sludge 21 is coagulated under the effect of the coagulant 23 to become a floc 22. The floc 22 and a supernatant liquid thus produced in the stirring tank 1 are continuously supplied through the discharge port 3 in the upper portion of the stirring tank 1 and the discharge pipe 10 into the endless travelling filter cloth type dewatering unit 6.

The process of the slurry sludge 21 and the coagulant 23 supplied into the stirring tank 1 through the feed port 2 at the lower end thereof of becoming the floc 22 and being discharged from the stirring tank 1 through the discharge port 3 in the upper portion thereof and the discharge pipe 10, requires a period of time of, for example, from 5 to 10 minutes. The floc 22 produced in the stirring tank 1 rises up therein at a speed about one fifth the rising speed of water. The floc 22 in the upper portion of the stirring tank 1 has therefore a concentration of about five times as high as the concentration of the slurry sludge 21 in the lower portion of the stirring tank 1.

The floc 22 continuously supplied, together with the supernatant liquid, through the discharge port 3 in the upper portion of the stirring tank 1 and the discharge pipe 10 into the endless travelling filter cloth type dewatering unit 6, falls continuously and gently onto the inlet side 8a of the endless travelling filter cloth 8, which is surrounded by the inner frame 9 of the endless travelling filter cloth type dewatering unit 6. The floc 22 thus having continuously fallen onto the inlet side 8a of the endless travelling filter cloth 8 continuously travels, on the endless travelling filter cloth 8, toward the exit side 8b thereof at a speed of, for example, from 0.2 to 1.0 m / minute. Since the upper surface of the inlet side 8a of the endless travelling filter cloth 8 is surrounded by the inner frame 9 as described above, the floc 22 never falls into the dewatering tank 7 from the endless travelling filter cloth 8.

While the floc 22 continuously travels, on the endless travelling filter cloth 8, toward the exit side 8b thereof, the floc 22 is further thickened on a portion of the endless travelling filter cloth 8, which portion is located in the supernatant liquid in the dewatering tank 7, and the resultant filtrate is oozed out downwardly through the endless travelling filter cloth 8. Then, the thus thickened floc 22 is dewatered into a cakey form on a portion of the endless travelling filter cloth 8, which portion is located above the surface of the supernatant liquid in the dewatering tank 7. The floc 22 having thus become cakey is scraped off by the scraper 14 on the exit side 8b of the endless travelling filter cloth 8 and discharged. The filtrate oozed out downwardly through the endless travelling filter cloth 8 is continuously discharged from the dewatering tank 7 through the filtrate discharge pipe 11.

As described above, the floc 22 supplied, together with the supernatant liquid, through the discharge port 3 and the discharge pipe 10, from the stirring tank 1 into the endless travelling filter cloth type dewatering unit 6, falls gently onto the inlet side 8a of the endless travelling filter cloth 8. The floc 22 is therefore supplied onto the inlet side 8a of the endless travelling filter cloth 8 without being collapsed. A flow toward the filtrate discharge pipe 11 is produced in the filtrate in the dewatering tank 7. As a result, the filtrate is oozed out through the endless travelling filter cloth 8 from the floc 22 on the endless travelling filter cloth 8. Thickening and dewatering of the floc 22 are thus accomplished in a short period of time on the endless travelling filter cloth 8.

The floc 22 thickened and dewatered on the endless travelling filter cloth 8 and discharged in the cakey form has a water content of about 90% and lower by 2 to 5% than the water content in a slurry sludge thickened by a conventional gravity type thickener or a floatation type thickener, and then, dewatered by a conventional dewatering unit. The above-mentioned water content in the floc 22 may further be reduced to 70 to 75% by dewatering the above-mentioned floc 22 by means of, for example, a belt-press type dewatering unit not shown.

FIG. 3 is a flow diagram illustrating a sewage treatment system according to the method of the present invention. As shown in FIG. 3, a sewage is introduced into a primary sedimentation tank 15, in which a sludge comprising grit and screenings in the sewage is sedimented to primarily separate the sludge from the sewage. The sewage from which the sludge has thus been primarily separated is introduced, together with a small amount of sludge returned from a final sedimentation tank 17 described later, into an aeration tank 16, in which the sewage is aerated. Then, the aerated sewage is introduced into a final sedimentation tank 17, in which a sludge remaining in the sewage is sedimented to separate the remaining sludge from the sewage. A supernatant liquid resulting from the separation of the remaining sludge is released. As described above, part of the sludge sedimented in the final sedimentation tank 17 is returned to the aeration tank 16 for reuse for the aeration of the sewage.

A slurry sludge sedimented in the primary sedimentation tank 15 is taken out therefrom, and a slurry sludge sedimented in the final sedimentation tank 17 is taken out therefrom. A coagulant 23 is added to the slurry sludge 21 taken out from each of the primary sedimentation tank 15 and the final sedimentation tank 17. The slurry sludge 21 added with the coagulant 23 is continuously supplied into a stirring tank 1 to convert the slurry sludge 21 into the floc 22 in the stirring tank 1 as described above.

Then, the floc 22 and a supernatant liquid, which are produced in the stirring tank 1 are continuously supplied from the stirring tank 1 into an endless travelling filter cloth type dewatering unit 6 to thicken and then dewater the floc 22 on an endless travelling filter cloth 8 of the endless travelling filter cloth type dewatering unit 6 as described above. The thus thickened and dewatered floc 22 into the cakey form is incinerated in an incinerator 20. A filtrate discharged from a dewatering tank 7 of the endless travelling filter cloth type dewatering unit 6 is returned to the inlet side of the aeration tank 16. Another dewatering unit not shown may be provided as required on the exit side of the endless travelling filter cloth type dewatering unit 6 to further dewater the cakey floc 22 discharged from the endless travelling filter cloth type dewatering unit 6, by means of such an additional dewatering unit.

Figure 4:
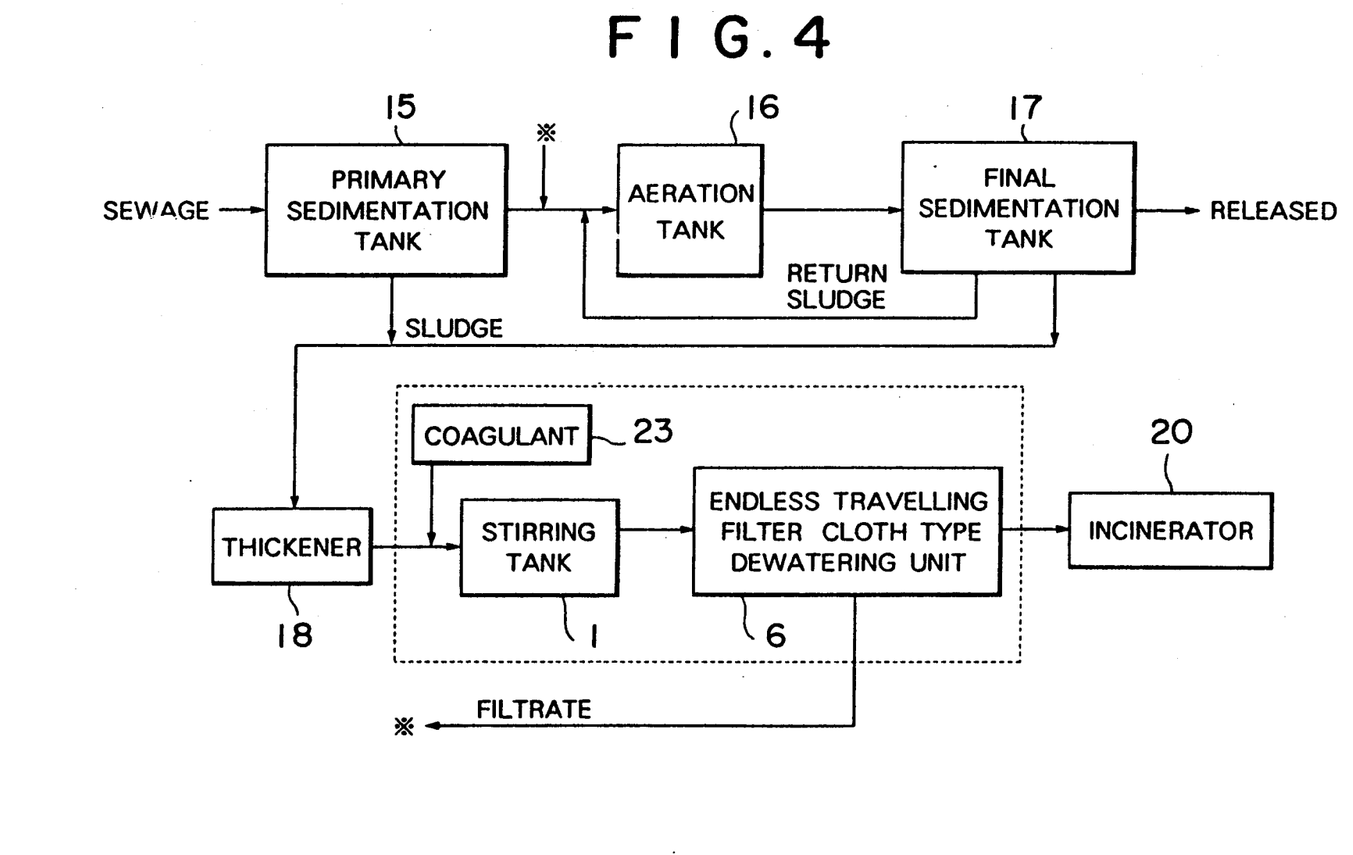
FIG. 4 is a flow diagram illustrating another sewage treatment system according to the method of the present invention.

FIG. 4 is a flow diagram illustrating another sewage treatment system according to the method of the present invention. The system shown in FIG. 4 differs from the system shown in FIG. 3 only in that a thickening equipment 18 is provided on the inlet side of the stirring tank 1, and the slurry sludge 21 is thickened in the thickening equipment 18 prior to supplying the slurry sludge 21 added with the coagulant 23 into the stirring tank 1. Since, according to the system shown in FIG. 4, the slurry sludge 21 is thickened prior to supplying same into the stirring tank 1, it is possible to efficiently thicken and dewater a large amount of slurry sludge.

Figure 5:
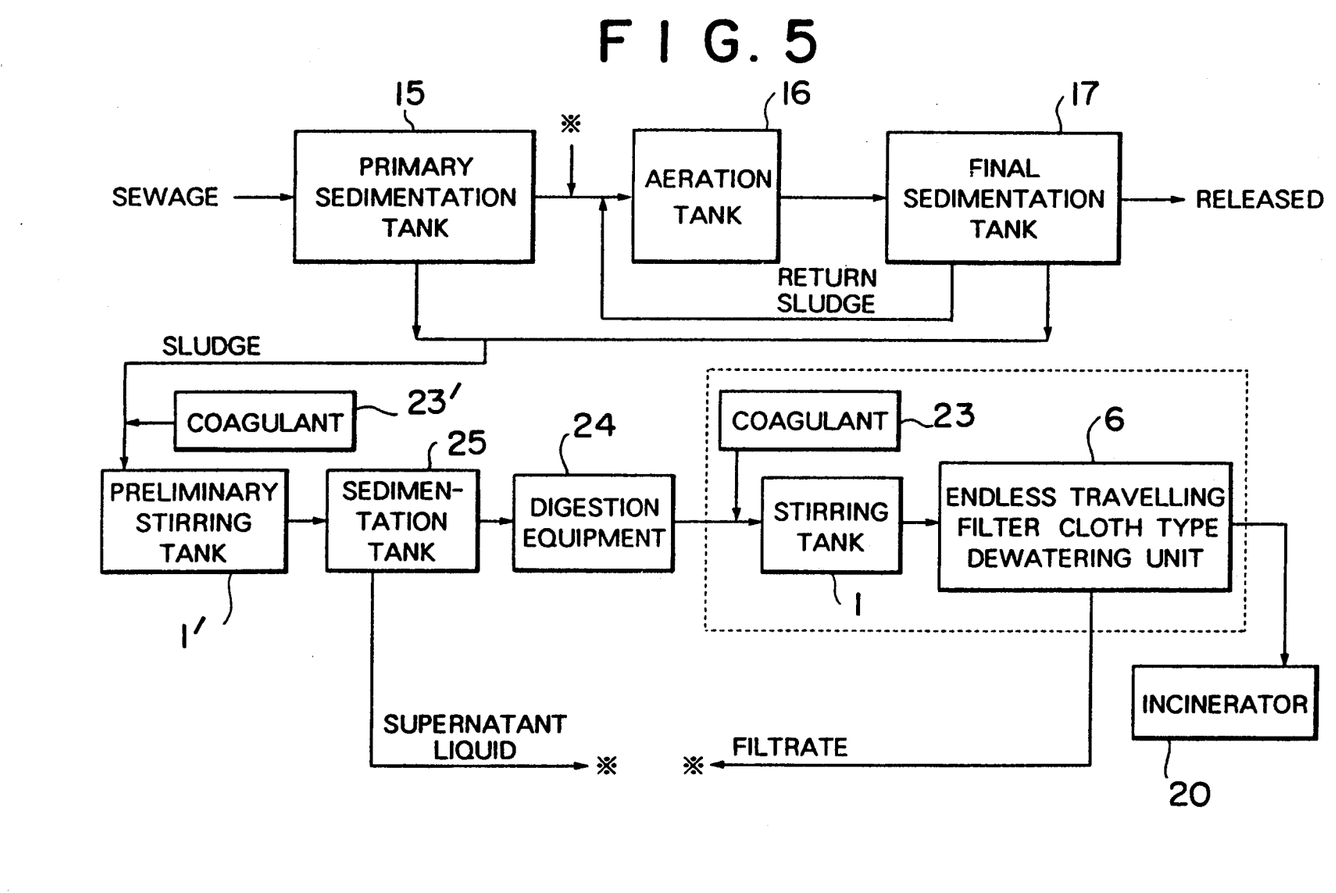
FIG. 5 is a flow diagram illustrating further another sewage treatment system according to the method of the present invention.

FIG. 5 is a flow diagram illustrating further another sewage treatment system according to the method of the present invention. The system shown in FIG. 5 differs from the system shown in FIG. 3 only in that a preliminary stirring tank 1', a sedimentation tank 25 and a digestion equipment 24 are provided in this order on the inlet side of the stirring tank 1. According to the system shown in FIG. 5, prior to supplying the slurry sludge 21 and the coagulant 23 into the stirring tank 1, the slurry sludge 21 and another coagulant 23' are continuously supplied into the preliminary stirring tank 1', in which the slurry sludge 21 and the another coagulant 23' are stirred to convert the slurry sludge 21 into a floc.

The floc and a resultant supernatant liquid, which are produced in the preliminary stirring tank 1', are then continuously supplied into the sedimentation tank 25 provided adjacently to the preliminary stirring tank 1' to thicken the floc.

Then, the thickened floc is continuously supplied into the digestion equipment 24 provided adjacently to the sedimentation tank 25, in which the thickened floc is digested. Since, according to the system shown in FIG. 5, the slurry sludge 21 is thickened and digested prior to supplying same into the stirring tank 1, it is possible to efficiently thicken and dewater a large amount of slurry sludge having a relatively low concentration.

Now, the method of the present invention is described more in detail by means of examples.

EXAMPLE 1

A slurry sludge 21 was thickened and dewatered in accordance with the method of the present invention as described below by the use of the apparatus shown in FIGS. 1 and 2.

A high-molecular coagulant 23 was added in an amount of about 0.4 wt. % relative to the solid content in a slurry sludge 21 to the slurry sludge 21 having a concentration of 14,000 ppm. The slurry sludge 21 thus added with the high-molecular coagulant 23 was continuously supplied into the stirring tank 1 through the feed port 2 at the lower end thereof to stir same in the stirring tank 1 under the following conditions:
 (1) Revolutions of the stirring blades 5: 40 rpm, and
 (2) Holding time of the slurry sludge 21 in the stirring tank 1: 10 minutes.

A floc 22 and a supernatant liquid, which were produced in the stirring tank 1, were continuously supplied, through the discharge port 3 in the upper portion of the stirring tank 1 and the discharge pipe 10, onto the inlet side 8a of the endless travelling filter cloth 8 of the endless travelling filter cloth type dewatering unit 6.

The floc 22 thus continuously supplied was thickened and then dewatered on the endless travelling filter cloth 8 under the following conditions:
 (1) Travelling speed of the endless travelling filter cloth 8: 0.4 m/minute, and
 (2) Holding time of the floc 22 on a portion of the endless travelling filter cloth 8, which portion is located above the surface of the supernatant liquid in the dewatering tank 7: 2 minutes.

The cakey floc 22 thus thickened and then dewatered on the endless travelling filter cloth 8 was scraped off by the scraper 14 on the exit side 8b of the endless travelling filter cloth 8 and discharged. The discharged cakey floc 22 had a water content of about 90%. The filtrate discharged from the filtrate discharge pipe 11 of the dewatering tank 7 had a solid content in an amount of only 3 ppm per liter of filtrate.

EXAMPLE 2

A slurry sludge 21 was thickened and dewatered in accordance with the method of the present invention as described below by the use of the apparatus shown in FIGS. 1 and 2 as in Example 1.

A high-molecular coagulant 23 was added in an amount of about 0.6 wt. % relative to the solid content in a slurry sludge 21 to the slurry sludge 21 having a thin concentration of 1,500 ppm. The slurry sludge 21 thus added with the high-molecular coagulant 23 was continuously supplied into the stirring tank 1 through the feed port 2 at the lower end thereof to stir same in the stirring tank 1 under the following conditions:
 (1) Revolutions of the stirring blades 5: 40 ppm, and
 (2) Holding time of the slurry sludge 21 in the stirring tank 1: 5 minutes.

A floc 22 and a supernatant liquid, which were produced in the stirring tank 1, were continuously supplied, through the discharge port 3 in the upper portion of the stirring tank 1 and the discharge pipe 10, onto the inlet side 8a of the endless travelling filter cloth 8 of the endless travelling filter cloth type dewatering unit 6.

The floc 22 thus continuously supplied was thickened and then dewatered on the endless travelling filter cloth 8 under the following conditions:
 (1) Travelling speed of the endless travelling filter cloth 8: 0.2 m/minute, and
 (2) Holding time of the floc 22 on a portion of the endless travelling filter cloth 8, which portion is located above the surface of the supernatant liquid in the dewatering tank 7: 4 minutes.

The cakey floc 22 thus thickened and then dewatered on the endless travelling filter cloth 8 was scraped off by the scraper 14 on the exit side 8b of the endless travelling filter cloth 8 and discharged. The discharged cakey floc 22 had a water content of about 93%. The filtrate discharged from the filtrate discharge pipe 11 of the dewatering tank 7 had a solid content in an amount of only 4 ppm per liter of filtrate.

According to the method of the present invention, as described above in detail, the following industrially useful effects are provided:

(1) Thickening and dewatering of a slurry sludge can be accomplished continuously in a short period of time with a site smaller than about a tenth as compared with the use of a conventional thickening equipment and a conventional dewatering equipment.

(2) Since thickening and dewatering of the slurry sludge are conducted in a short period of time, as described above, the slurry sludge hardly becomes anaerobic, thus leading to a very slight amount of dissolution of detrimental constituents such as phosphorus contained in the slurry sludge into the filtrate.

(3) Since thickening and dewatering of the slurry sludge are conducted in a short period of time, and a fresh slurry sludge is always thickened and dewatered, as described above, it suffices to add a coagulant in an amount of only about two thirds that required in a conventional method.

(4) A water content in the floc discharged in a cakey form is lower by 2 to 5% than that in a slurry sludge thickened by a conventional gravity type or floatation type thickener and then dewatered by a conventional dewatering unit.

(5) Since thickening and dewatering of the slurry sludge are continuously carried out by means of the endless travelling filter cloth type dewatering unit, it is not necessary, as in a conventional method, to provide a dewatering equipment separately from a thickening equipment or to employ conduits and pumps for introducing the slurry sludge thickened by the thickening equipment into the dewatering equipment. It is therefore possible to thicken and dewater a slurry sludge economically and efficiently with a lower equipment cost.

What is claimed is:

1. A method for thickening and dewatering a slurry sludge, comprising the steps of:

(a) continuously supplying a slurry sludge and a coagulant into a stirring tank, provided substantially vertically, at a lower end of said stirring tank, in which said slurry sludge and said coagulant are stirred while causing said slurry sludge and said coagulant to rise to convert said slurry sludge into a floc, and continuously thickening said floc by the difference in rising speeds in said stirring tank between said floc and a supernatant liquid separated from said slurry sludge;

(b) providing, adjacently to said stirring tank, an endless travelling filter cloth type dewatering unit which comprises a dewatering tank containing said supernatant liquid separated from said slurry sludge and an inclined endless travelling filter cloth arranged in said dewatering tank with an inlet side thereof located beneath the surface of said supernatant liquid in the dewatering tank and at a lower portion of one end of said dewatering tank and an exit side thereof located outside and above the surface of the supernatant liquid in the dewatering tank and the other end of said dewatering tank, said dewatering tank having, at an upper portion of said other end thereof, a filtrate discharge pipe for discharging a filtrate filtered through said endless travelling filter cloth;

(c) continuously supplying said thickened floc and said supernatant liquid, which are produced in said stirring tank, from a discharge port of said stirring tank, said discharge port being beneath the surface of said supernatant liquid in the dewatering tank and being provided at an upper end thereof adjacently to said endless travelling filter cloth, onto said inlet side of said endless travelling filter cloth of said endless travelling filter cloth type dewatering unit, thus causing said thickened floc to gently fall onto said endless travelling filter cloth without being collapsed; and (d) continuously causing said floc thus continuously supplied to travel, on said endless travelling filter cloth, toward said exit side of said endless travelling filter cloth;

thereby further thickening said floc on a first submerged portion of said endless travelling filter cloth, which first submerged portion is located in said supernatant liquid in said dewatering tank, and dewatering said further thickened floc on a second portion of said endless travelling filter cloth, which second portion is located above the surface of said supernatant liquid in said dewatering tank.

2. The method as claimed in claim 1, wherein:
said slurry sludge is thickened prior to supplying said slurry sludge and said coagulant into said stirring tank.

3. The method as claimed in claim 1, wherein:
prior to supplying said slurry sludge and said coagulant into said stirring tank, said slurry sludge and another coagulant are continuously supplied into a preliminary stirring tank, in which said slurry sludge and said another coagulant are stirred to convert said slurry sludge into a floc; then said floc and a supernatant liquid, which are produced in said preliminary stirring tank, are continuously supplied into a sedimentation tank provided adjacently to said preliminary stirring tank to thicken said floc in said sedimentation tank; then said thickened floc is continuously supplied into a digestion means provided adjacently to said sedimentation tank to digest said thickened floc in said digestion means; and then said digested floc and said coagulant are continuously supplied into said stirring tank.

4. The method as claimed in claim 3, wherein said slurry sludge is thickened prior to supplying said slurry sludge and said coagulant into said stirring tank.

5. The method as claimed in claim 4, wherein step (a) is carried out for 5 to 10 minutes.

6. The method as claimed in claim 5, wherein said floc in step (d) travels at a speed of 0.2 to 1.0 m/minute.

7. The method as claimed in claim 6, wherein said coagulant is supplied in step (a) in an amount of 0.4 to 0.6 wt. % relative to the solid content in the slurry sludge.

8. The method as claimed in claim 7, wherein the floc in the upper end of the stirring tank has a concentration of about five times as high as the concentration of the slurry sludge in the lower end of the stirring tank.

9. The method as claimed in claim 1, wherein the floc in the end of the stirring tank has a concentration of about five times as high as the concentration of the slurry sludge in the lower end of the stirring tank.

10. The method as claimed in claim 1, wherein the stirring is carried out in a single stage.

* * * * *

UNITED STATES PATENT AND TRADEMARK OFFICE
CERTIFICATE OF CORRECTION

PATENT NO. : 5,167,821
DATED : December 1, 1992
INVENTOR(S) : TAMBO et al It is certified that error appears in the above-identified patent and that said Letters Patent is hereby corrected as shown below:

Title Page:

Section [19] under "United States Patent",
        change "Tanbo et al" to --Tambo et al--.

Section [75] Inventors,
        change "Norhito Tanbo" to --Norhito Tambo--.

Section [87] PCT Pub. Date,
        change "Oct. 1, 1991" to --Jan. 10, 1991--.

Drawing Sheet 5 of 5,
    after "FIG. 6", insert --(PRIOR ART)--.

Column 10, line 53 (claim 9),
    before "end", insert --upper--.

Signed and Sealed this

Fifteenth Day of February, 1994

*Attest:*

BRUCE LEHMAN

*Attesting Officer*      Commissioner of Patents and Trademarks